(12) United States Patent
Matsuda

(10) Patent No.: US 7,673,168 B2
(45) Date of Patent: Mar. 2, 2010

(54) NETWORK NODE, SWITCH, AND NETWORK FAILURE RECOVERY METHOD

(75) Inventor: Yasuhiro Matsuda, Kaisei (JP)

(73) Assignee: Hitachi, Ltd., Tokyo (JP)

(*) Notice: Subject to any disclaimer, the term of this patent is extended or adjusted under 35 U.S.C. 154(b) by 714 days.

(21) Appl. No.: 11/430,022

(22) Filed: May 9, 2006

(65) Prior Publication Data

US 2007/0226532 A1    Sep. 27, 2007

(30) Foreign Application Priority Data

Mar. 22, 2006  (JP) ............................. 2006-079237

(51) Int. Cl.
*G06F 11/00* (2006.01)

(52) U.S. Cl. ............... 714/4; 714/3; 714/15; 709/203; 709/219; 709/223; 370/216; 370/242; 370/351; 370/400

(58) Field of Classification Search ............ 714/3, 714/4, 15; 709/203, 219, 223; 370/216, 370/242, 351, 400
See application file for complete search history.

(56) References Cited

U.S. PATENT DOCUMENTS

| | | | | |
|---|---|---|---|---|
| 5,448,723 A * | 9/1995 | Rowett | ........................... | 714/4 |
| 5,796,934 A * | 8/1998 | Bhanot et al. | .................. | 714/4 |
| 5,856,981 A * | 1/1999 | Voelker | ....................... | 714/712 |
| 6,098,094 A * | 8/2000 | Barnhouse et al. | .......... | 709/203 |
| 6,122,753 A * | 9/2000 | Masuo et al. | .................. | 714/4 |
| 6,393,476 B1 * | 5/2002 | Barnhouse et al. | .......... | 709/223 |
| 6,601,084 B1 * | 7/2003 | Bhaskaran et al. | .......... | 718/105 |
| 6,633,560 B1 * | 10/2003 | Albert et al. | ................. | 370/351 |
| 6,748,550 B2 * | 6/2004 | McBrearty et al. | ............. | 714/4 |
| 6,785,546 B1 * | 8/2004 | Djuric | ........................ | 455/445 |
| 6,999,459 B1 * | 2/2006 | Callon et al. | ................. | 370/400 |
| 2001/0014913 A1 * | 8/2001 | Barnhouse et al. | .......... | 709/223 |
| 2001/0032239 A1 * | 10/2001 | Sashino et al. | .............. | 709/203 |
| 2002/0031085 A1 * | 3/2002 | Maeno | ....................... | 370/216 |
| 2004/0047354 A1 * | 3/2004 | Slater et al. | .................. | 370/400 |
| 2004/0049572 A1 * | 3/2004 | Yamamoto et al. | .......... | 709/224 |
| 2005/0050401 A1 | 3/2005 | Matsuki et al. | | |
| 2005/0097213 A1 * | 5/2005 | Barrett et al. | ................ | 709/231 |
| 2005/0108021 A1 * | 5/2005 | Anderson et al. | .............. | 705/1 |
| 2005/0195736 A1 * | 9/2005 | Matsuda | ...................... | 370/216 |
| 2006/0092848 A1 * | 5/2006 | Matsuda | ...................... | 370/242 |

FOREIGN PATENT DOCUMENTS

JP      2005-071196      3/2005

OTHER PUBLICATIONS

Manchester, "IP over SONET" 1998, Bell Laboratories, pp. 136-142.*

(Continued)

*Primary Examiner*—Robert Beausoliel
*Assistant Examiner*—Jeison C Arcos
(74) *Attorney, Agent, or Firm*—Brundidge & Stanger, P.C.

(57) ABSTRACT

A switch includes a reference log storage table for storing a plurality of reference logs for performing normal connection processing between network nodes, a connection candidate log search program for searching for a connection candidate log from among a plurality of reference logs based on a failure log acquired when a connection failure occurs between network nodes; and a re-connection program for re-connecting the network nodes by using the connection candidate log.

22 Claims, 14 Drawing Sheets

OTHER PUBLICATIONS

Boehm, "Progress in Standardization of SONET" May 1990, IEEE, pp. 8-16.*

Cisco, "OC12 Packet over SONET Line Card Installation and COnfiguration", 2002, Cisco Systems, pp. 1-1-4-14.*

Hiatt, "SONET Synchronous Optical Networking", Jan. 1999, Lucent Technologies, pp. 1-22.*

* cited by examiner

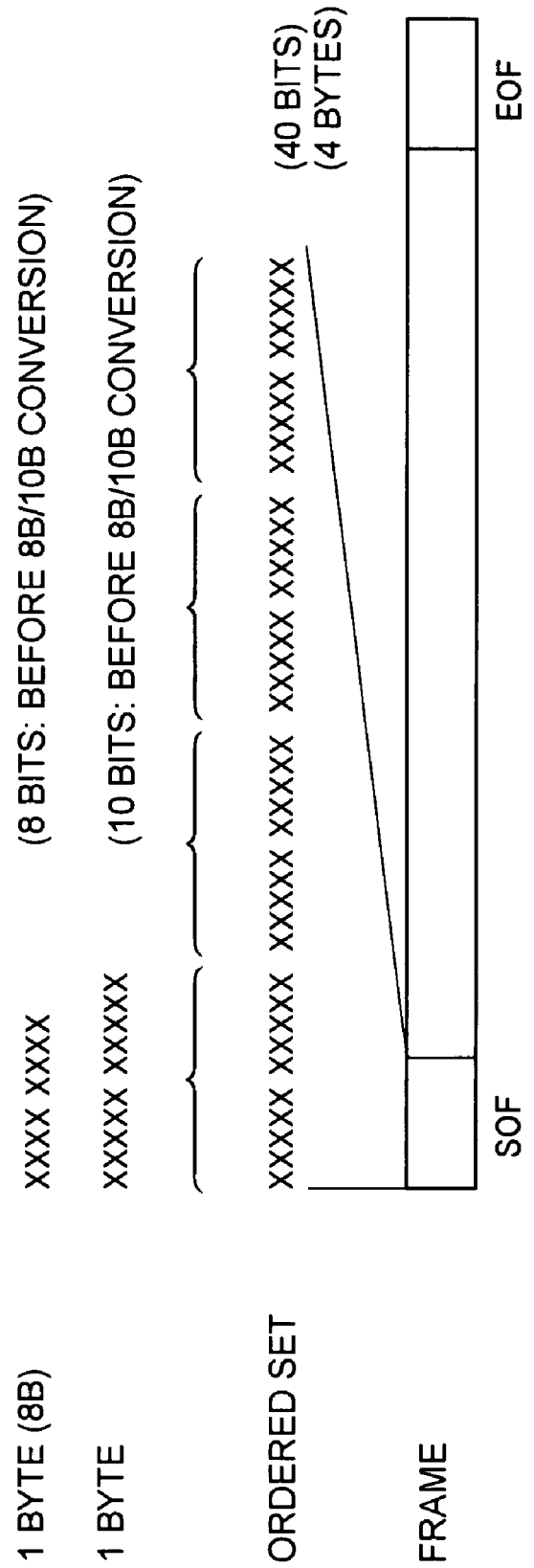

FIG.3

| Delemiter Function | RD+ or − | ORDERED SET |
|---|---|---|
| SOF Connect Class 1(SDFe1) | Negative | K28.5 D21.5 D23.0 D23.0 |
| SOF Initiate Class1(SOFi1) | Negative | K28.5 D21.5 D23.2 D23.2 |
| SOF Normal Class 1(SOFn1) | Negative | K28.5 D21.5 D23.1 D23.1 |
| SOF Initiate Class1(SOFi2) | Negative | K28.5 D21.5 D21.2 D21.2 |
| SOF Normal Class 1(SOFn2) | Negative | K28.5 D21.5 D21.1 D21.1 |
| SOF Initiate Class1(SOFi3) | Negative | K28.5 D21.5 D22.2 D22.2 |
| SOF Normal Class 1(SOFn3) | Negative | K28.5 D21.5 D22.1 D22.1 |
| SOF Fabric (SOFi) | Negative | K28.5 D21.5 D24.2 D24.2 |
| EOF Terminate (EOFt) | Negative | K28.5 D21.4 D21.3 D21.3 |
|  | Positive | K28.5 D21.5 D21.3 D21.3 |
| EOF Diaconnect-Terminate (EOFdt) | Negative | K28.5 D21.4 D21.4 D21.4 |
|  | Positive | K28.5 D21.5 D21.4 D21.4 |
| EOF Abort (EOFa) | Negative | K28.5 D21.4 D21.7 D21.7 |
|  | Positive | K28.5 D21.5 D21.7 D21.7 |
| EOF Normal(EOFn) | Negative | K28.5 D21.4 D21.6 D21.6 |
|  | Positive | K28.5 D21.5 D21.6 D21.6 |
| EOF Diaconnect-Terminate-Invalid(EOFdti) | Negative | K28.5 D21.4 D21.6 D21.5 |
|  | Positive | K28.5 D10.4 D21.4 D21.4 |
| EOF Normal-Invalid (EOFni) | Negative | K28.5 D10.4 D21.6 D21.6 |
|  | Positive | K28.5 D10.5 D21.6 D21.6 |

FIG.4

| PRIMITIVE SIGNAL | RD+ or − | ORDERED SET |
|---|---|---|
| Idle | Negative | K28.5 D21.4 D21.6 D21.5 |
| Receiver_Ready(R_RDY) | Negative | K28.5 D21.4 D10.2 D10.2 |

FIG.5

| PRIMITIVE SIGNAL (Primitive Sequence) | RD+ or − | ORDERED SET |
|---|---|---|
| Offline(OLS) | Negative | K28.5 D21.1 D10.4 D21.5 |
| Not_Operetional(NOS) | Negative | K28.5 D21.2 D31.5 D5.2 |
| Link_Repet(L.R) | Negative | K28.5 D9.2 D31.5 D3.2 |
| Link_Repet Response(L.RR) | Negative | K28.5 D21.1 D31.5 D9.2 |

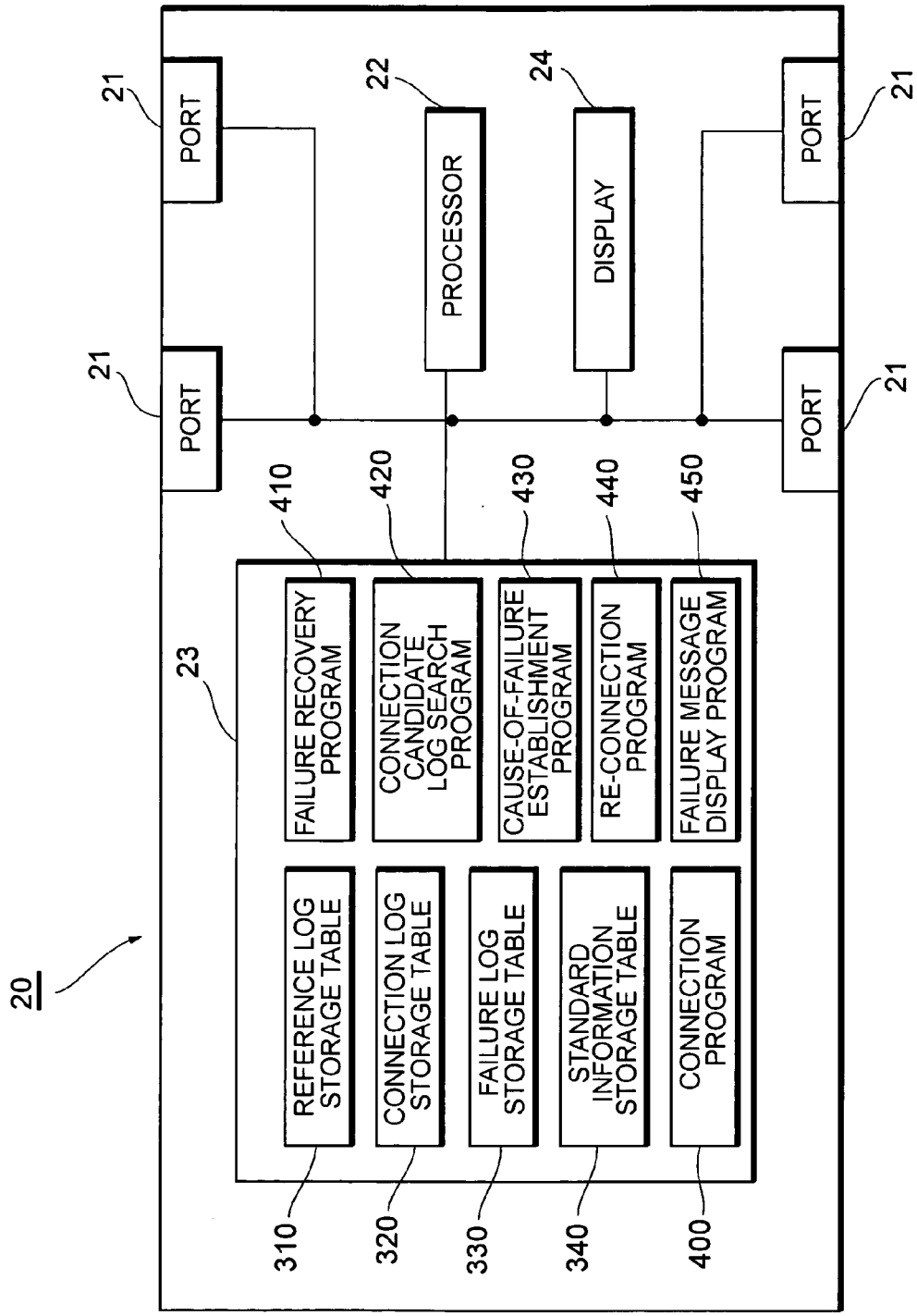

FIG.7

REFERENCE LOG STORAGE TABLE 310

| LOG NUMBER | VENDOR INFORMATION | LOG INFORMATION |
|---|---|---|
| 1 | COMPANY A: HBA | REFERENCE LOG |
| 2 | COMPANY B: HBA | REFERENCE LOG |
| 3 | COMPANY C: HBA | REFERENCE LOG |
| 4 | COMPANY D: SWITCH | REFERENCE LOG |
| 5 | COMPANY E: SWITCH | REFERENCE LOG |
| 6 | COMPANY F: SWITCH | REFERENCE LOG |
| 7 | COMPANY G: STORAGE | REFERENCE LOG |
| 8 | COMPANY H: STORAGE | REFERENCE LOG |
| 9 | COMPANY I: STORAGE | REFERENCE LOG |
| 10 | COMPANY J: MTL | REFERENCE LOG |
| 11 | COMPANY K: MTL | REFERENCE LOG |

FIG.8

CONNECTION LOG STORAGE TABLE 320

| PORT NUMBER | LOG INFORMATION | REGISTERED LOG INFORMATION |
|---|---|---|
| 1 | CONNECTION LOG | COMPANY A: HBA |
| 2 | CONNECTION LOG | COMPANY B: HBA |
| 3 | CONNECTION LOG | COMPANY C: HBA |
| 4 | CONNECTION LOG | COMPANY D: HBA |
| 5 | CONNECTION LOG | COMPANY E: STORAGE |
| 6 | CONNECTION LOG | — |
| 7 | CONNECTION LOG | — |
| 8 | CONNECTION LOG | — |

NETWORK NODE, SWITCH, AND NETWORK FAILURE RECOVERY METHOD

CROSS-REFERENCES TO RELATED APPLICATIONS

This application relates to and claims priority from Japanese Patent Application No. 2006-079237, filed on Mar. 22, 2006, the entire disclosure of which is incorporated herein by reference.

BACKGROUND

The present invention relates to a network node, switch, and network failure recovery method for recovering from a connection failure occurring between network nodes.

The government, public offices, local governments, companies and educational institutes manage a large amount of various kinds of data, and that data is managed by using relatively large-scale storage systems. A storage system has a disk array system. A disk array system is formed by arranging a large number of storage devices in arrays and provides storage areas having a RAID (Redundant Arrays of Independent Disks) configuration to a host computer.

According to recent widespread use of SANs (Storage Area Networks), storage systems are being rapidly integrated. In a SAN environment having a complicated network topology where a plurality of storage systems are connected via switches to a plurality of host computers, an immediate response to a network failure is required.

For example, Japanese Patent Laid-Open Publication No. 2005-71196 discloses a method for controlling failure information in a storage system that can be connected to different kinds of networks.

SUMMARY

In a SAN environment, it can be assumed that products (host computers, switches, storage systems, etc.) provided by various vendors are connected to an FC-SAN (Fibre Channel Storage Area Network). Although Fibre Channel has a standardized interface protocol, the interpretation of the standard is different, depending on the vendor. Accordingly, when a company A's switch is connected to a company B's storage system, a connection failure may occur because of different interface protocols. In a large-scale FC-SAN, difference in transmission/reception timing provided in an interface protocol may occur, resulting in a connection failure.

Accordingly, an object of the present invention is to solve the above described problem and automatically recover from a connection failure between network nodes.

To achieve the above-stated object, a network node according to the present invention searches for a connection candidate log from among a plurality of reference logs based on a failure log acquired when a connection failure occurs between a plurality of network nodes that are separately connected to a network, and re-connect the network nodes by using the connection candidate log. The "reference log" is a connection log with a vendor-confirmed connection verification. Connection logs that have confirmed connection verification for connection to network nodes provided by various vendors are preferably used as the reference logs. By re-connecting the network nodes, the network failure can be recovered from. According to a preferred embodiment of the present invention, a network node may also establish the cause of the failure on an interface protocol between network nodes and a failure log and display that cause of the failure.

According to the present invention, a connection failure between network nodes can be automatically recovered from.

DESCRIPTION OF THE DRAWINGS

FIG. 2 is a diagram illustrating a Fibre Channel frame.

FIG. 3 is a diagram illustrating a delimiter ordered set.

FIG. 4 is a diagram illustrating a primitive signal ordered set.

FIG. 5 is a diagram illustrating a primitive sequence ordered set.

FIG. 6 is a diagram showing the hardware configuration of a switch according to an embodiment of the present invention.

FIG. 7 is a diagram illustrating a reference log storage table maintained by a switch.

FIG. 8 is a diagram illustrating a connection log storage table maintained by a switch.

DETAILED DESCRIPTION

Figure 1:
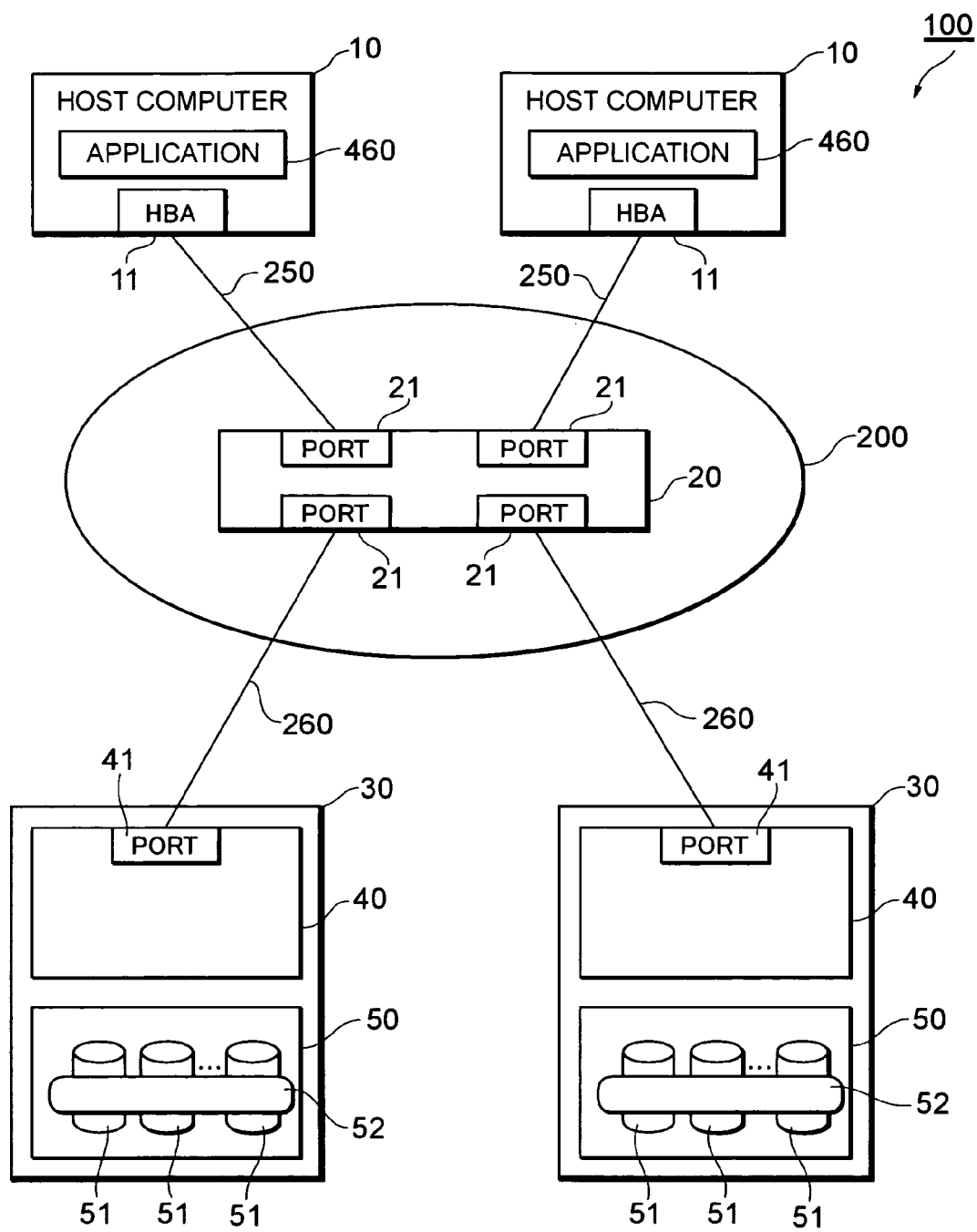
FIG. 1 is a diagram showing the network configuration of a storage network system according to an embodiment of the present invention.

An embodiment of the present invention will be described below with reference to the drawings. FIG. 1 shows the network configuration of a storage network system 100 according to the present embodiment. The storage network system 100 includes a plurality of host computers 10, a plurality of storage systems 30, and an FC-SAN 200. The FC-SAN 200 is a storage area network for controlling data transmission in blocks according to a communication protocol such as Fibre Channel Protocol or iSCSI (internet Small Computer System Interface). The FC-SAN 200 has one or more switches 20 for controlling connection switching between the host computers 10 and the storage systems 30.

Each host computer 10 is a workstation system, mainframe computer, or personal computer, etc. The host computer 10 has one or more host bus adapters (HBA) 11 for connection to the storage system 30 via the FC-SAN 200 and an application program 460 that uses storage resources in the storage systems 30. Each host adapter 11 is an adapter card connected to a bus in the host computer 10 and functions as an initiator interface for SCSI communication. By having the host bus adapter 11 function as a network interface card (NIC), it can also communicate with other host computers 10 according to TCP/IP. The application program 460 is a business program (e.g., database software, web application software, streaming application software, or e-business application software).

Each storage system 30 includes a storage device 50 having a plurality of disk drives 51 and a controller 40 for controlling data input/output to/from the storage device 50. The controller 40 has one or more ports 41 for connection to the host computer 10 via the FC-SAN 200. The controller 40 can control the plurality of the disk drives 51 in RAID levels (e.g., 0, 1, 5) defined in the RAID system. In the RAID system, the plurality of the disk drives 51 is managed as a RAID group. A RAID group is formed by grouping, for example, four disk drives 51 (3D+1P), or eight disk drives 51 (7D+1P). One or more logical units 52, being access units for the host computer 10, are defined in a RAID group. A plurality of logical units 52 can be defined by dividing up a RAID group, and one logical unit 52 can also be defined by grouping a plurality of RAID groups.

Each logical unit 52 is mapped to a port 41. If the host computer 10 is a UNIX® system, the logical unit 52 is associated with a device file. If the host computer 10 is a Windows® system, the logical unit 52 is associated with a drive letter (drive name). An LUN (Logical Unit Number) is assigned to each logical unit 52.

Each disk drive 51 is a storage device such as an FC (Fibre Channel) disk drive, SATA (Serial Advance Technology Attachment) disk drive, PATA (Parallel Advanced Technology Attachment) disk drive, FATA (Fibre Attached Technology Adapter) disk drive, SAS (Serial Attached SCSI) disk drive, or SCSI (Small Computer System Interface) disk drive.

Each switch 20 has two or more ports 21. One port 21 is connected to a host computer 10 via a connection path 250, and the other port 21 is connected to a storage system 30 via a connection path 260. The switch 20 may be a virtual switch that is an SCSI target for the host computer 10.

FIG. 2 shows a Fibre Channel frame. The serial transmission format is used in data communication in the FC-SAN 200. In each host computer 10 and storage system 30, data processing is performed after parallel-converting serial data. The parallel-to-serial conversion is performed with 8B/10B conversion. As shown in FIG. 2, the minimum unit with which 8B/10B converted serial data carries meaning is referred to as an "ordered set." An ordered set consists of 40 bits. A data transmission unit according to Fibre Channel Protocol is called a "Fibre Channel frame." A plurality of Fibre Channel frames is gathered to form a sequence, and a plurality of sequences is gathered to form an exchange.

The ordered sets include delimiter ordered sets, primitive signal ordered sets, and primitive sequence ordered sets.

FIG. 3 shows the delimiter ordered sets. The delimiter ordered sets are used as a separator of Fibre Channel frames. The head of a Fibre Channel frame is provided with an SOF (Start of Frame) and the end of a Fibre Channel frame is provided with an EOF (End of Frame). The delimiter ordered sets include, for example, those meaning "Class 1 Connection" (SOFc1), "Class 2 Initiation" (SOFi2), and "Link Disconnection" (EOFt). Whether transmitting, as RD+ or RD−, the ordered sets after EOFt that have ambiguous RD (Running Disparity) are determined based on the previous data. One of two 10-bit groups that are selected so that the number of "1"s and "0"s is equal in those groups is referred to as "RD+" and the other is referred to as "RD−."

FIG. 4 shows the primitive signal ordered sets. The primitive signal ordered sets are used when a response is sent back from a responder to an originator or initiator. "R_RDY (Receiver_Ready)" indicates that a Fibre Channel frame has been received. "Idle" indicates that a link is available. "R_RDY" and "Idle" are normally used. In addition, the primitive signal ordered sets (not shown in FIG. 4) include one necessary for arbitration in the loop topology.

FIG. 5 shows the primitive sequence ordered sets. The primitive sequence ordered sets include ones meaning "Link Offline" (OLS), "Link Not Operational" (LOS), and "Link Reset" (LR), etc. In addition, primitive sequence ordered sets not shown in FIG. 5 include ordered sets relating to a loop initialization processing sequence (LIP).

The sequence (issue timing, issue number, and timeout period, etc. for ordered sets or Fibre Channel frames) necessary for establishing and maintaining a link between the host bus adapter 11 in each host computer 10 and the port 21 in each switch 20 is predetermined in Fibre Channel Protocol, and so is the sequence necessary for establishing and maintaining a link between the port 21 in each switch 20 and the port 41 in each storage system 30. However, because interpretation of the standard is different with different vendors, the types, issue timing, and timeout period for ordered sets or Fibre Channel frames contained in a link establishment sequence may differ depending on the vendor. With that difference, a connection failure may occur because of a link error between different vendors' products.

The sequence transmitted and received by the storage system 30 when establishing a link is different when a switch 20 exists between the host computer 10 and the storage system 30 (when the storage system 30 is connected to a network), and when no switch 20 exists between the host computer 10 and the storage system 30 (when the storage system 30 is used as a stand-alone system). If the storage system 30 is connected to a network, the storage system 30 has to execute the sequence based on the standard interpretation of the vendor providing the switch 20, because there is a link established between the storage system 30 and the switch 20. Meanwhile, if the storage system 30 is used as a stand-alone system, the storage system 30 has to execute the sequence based on the standard interpretation of the vendor providing the host computer 10, because a link is established between the storage system 30 and the host computer 10.

In the present embodiment, a connection failure between network nodes is automatically recovered from and the difference in interface protocols is overcome because the host computer 10, switch 20, storage system 30, and other network nodes have a network failure recovery function.

Figure 9:
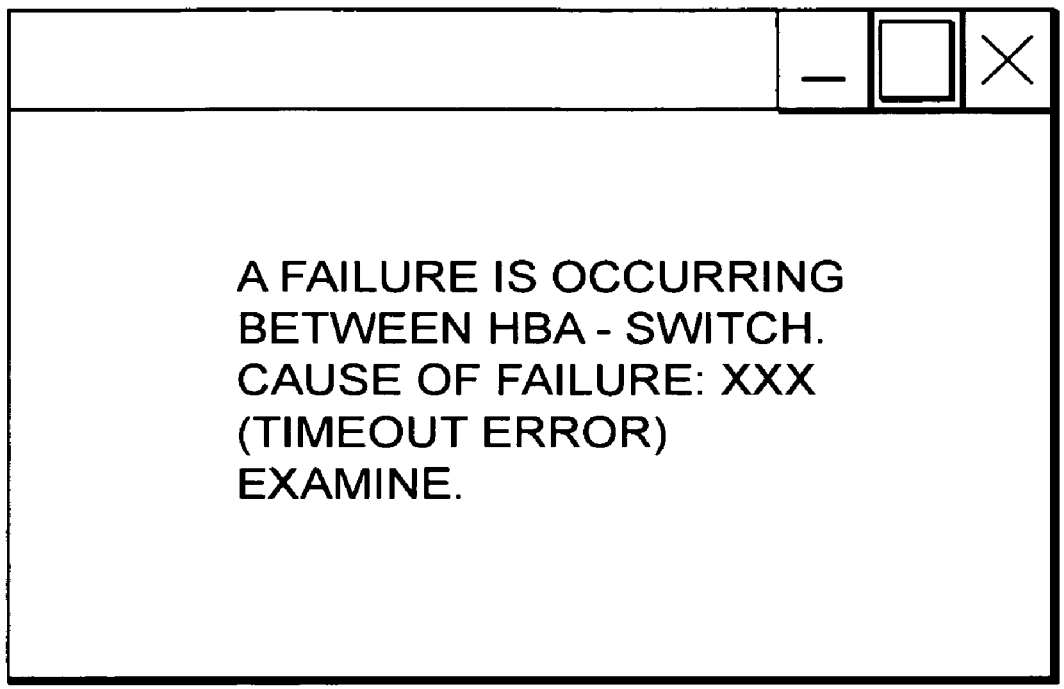
FIG. 9 is a diagram showing an image displaying a failure message.

FIG. 6 shows the hardware configuration of each switch 20 having the network failure recovery function. The switch 20 has two or more ports 21, processor 22, storage device 23, and display 24. The storage device 23 includes a reference log storage table 310, connection log storage table 320, failure log storage table 330, standard information storage table 340, connection program 400, failure recovery program 410, connection candidate log search program 420, cause-of-failure establishment program 430, re-connection program 440, and failure message display program 450. The processor 22 controls the connection between the host computer 10 and storage system 30. When a connection failure occurs, the processor 22 performs the failure recovery processing by interpreting and executing the command code of the above programs (the failure recovery program 410, connection candidate log search program 420, cause-of-failure establishment program 430, re-connection program 440, and failure message display program 450). When a connection failure occurs, the display 24 shows a failure message (information such as a cause of the failure), as shown in FIG. 9.

The reference log storage table 310 stores reference logs for connection to network nodes (host computers, switches, storage systems, and tape libraries, etc.) provided by various vendors. In this specification, a "reference log" means a connection log with a vendor-confirmed connection verification. The reference logs can be acquired from each vendor's web site, etc. As in the example shown in FIG. 7, the reference log storage table 310 contains the "log number," "vendor information," and "log information." The "log number" indicates unique identification information provided for each reference log. The "vendor information" indicates the vendor and specific product provided by the vendor. The "log information" indicates reference log information.

In the example shown in FIG. 7, the reference log storage table 310 stores reference logs for connection to company A's host bus adapter, company B's host bus adapter, company C's host bus adapter, company D's switch, company E's switch, company F's switch, company G's storage system, company H's storage system, company I's storage system, company J's tape library, and company K's tape library. The reference logs shown in FIG. 7 are used for ease of explanation, but the embodiment is not limited to them.

The connection log storage table 320 stores connection logs for each port 21 with which the port 21 in each switch 20 has been successfully connected to network nodes (host computers, storage systems, and tape libraries, etc.) on the FC-SAN 200. As in the example shown in FIG. 8, the connection log storage table 320 contains the "port number," "log information," and "registered log information." The "port number" indicates unique identification information given to the port 21 in each switch 20. The "log information" indicates information about a connection log with which connection processing is successfully executed. The "registered log information" indicates, when connection processing has failed with a connection log but has succeeded with a reference log, which product provided by which vendor that reference log is for connection to.

As described in detail later, the switch 20 establishes connection to a network node by using the connection log stored in the connection log storage table 320. When connection to a network node newly added to the FC-SAN 200 is attempted, that connection does not always succeed with a connection log stored in the connection log storage table 320. In that case, the switch 20 re-connects to the network node by using a reference log. The "registered log information" indicates, when re-connection has succeeded with a reference log, which product provided by which vendor that reference log is for connection to.

The failure log storage table 330 stores failure logs acquired when connection processing fails. The standard information storage table 340 stores detailed standard information (e.g., the type, issue timing, and timeout period, etc. for ordered sets or Fibre Channel frames contained in the sequence for establishing a link) concerning Fibre Channel Protocol.

The connection program 400 is a program (connection section) for executing connection processing (FIG. 10) between network nodes. The failure recovery program 410 is a program (failure recovery section) for executing processing (FIG. 11) for recovering from a failure between network nodes. The connection candidate log search program 420 is a program (connection candidate log search section) for executing processing (FIG. 12) for searching for a connection candidate log from among a plurality of reference logs. The cause-of-failure establishment program 430 is a program (cause-of-failure establishment section) for executing processing (FIG. 14) for establishing the cause of the connection failure between network nodes. The re-connection program 440 is a program (re-connection section) for performing re-connection processing (FIG. 13) for network nodes. The failure message display program 450 is a program for displaying the cause of the failure.

Next, the failure recovery processing performed when a connection failure occurs between a network node (either or both of the host computer 10 or/and the storage system 30) and the switch 20 will be described with reference to FIGS. 10 to 14.

Figure 10:
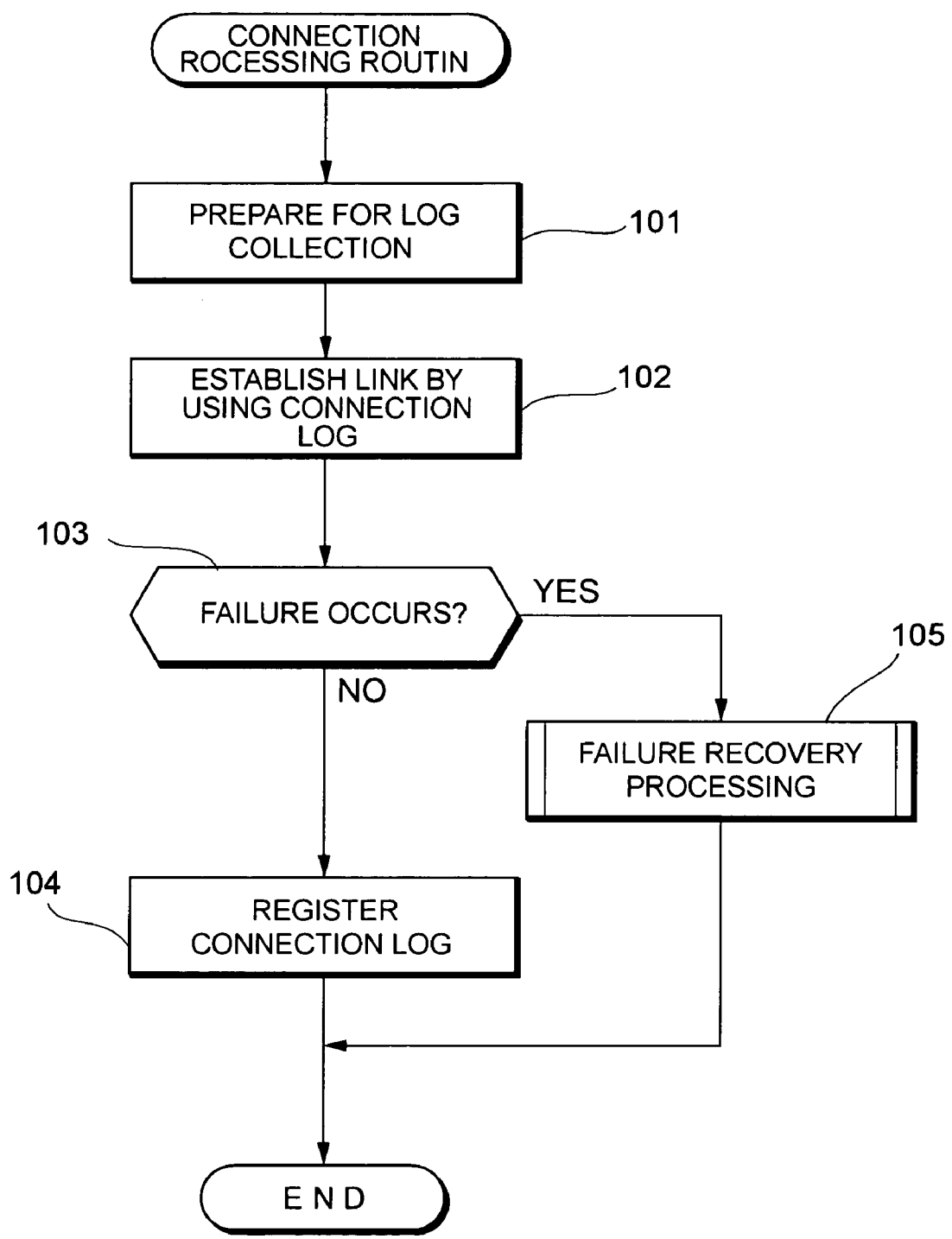
FIG. 10 is a flowchart illustrating a connection processing routine.

FIG. 10 is a flowchart illustrating the connection processing routine sequence. The switch 20 first calls the connection program 400 and prepares to collect connection logs (step 101). Next, the switch 20 establishes a link between the switch 20 and a network node by using a connection log stored in the connection log storage table 320 (step 102).

If a connection failure caused by a difference in interface protocols does not occur (step 103; NO), the switch 20 stores the connection log with which connection to the network node has succeeded in the connection log storage table 320 (step 104).

If a connection failure occurs due to a difference in interface protocols (step 103; YES), the switch 20 calls the failure recovery program 410 and performs the failure recovery processing (step 105).

Figure 11:
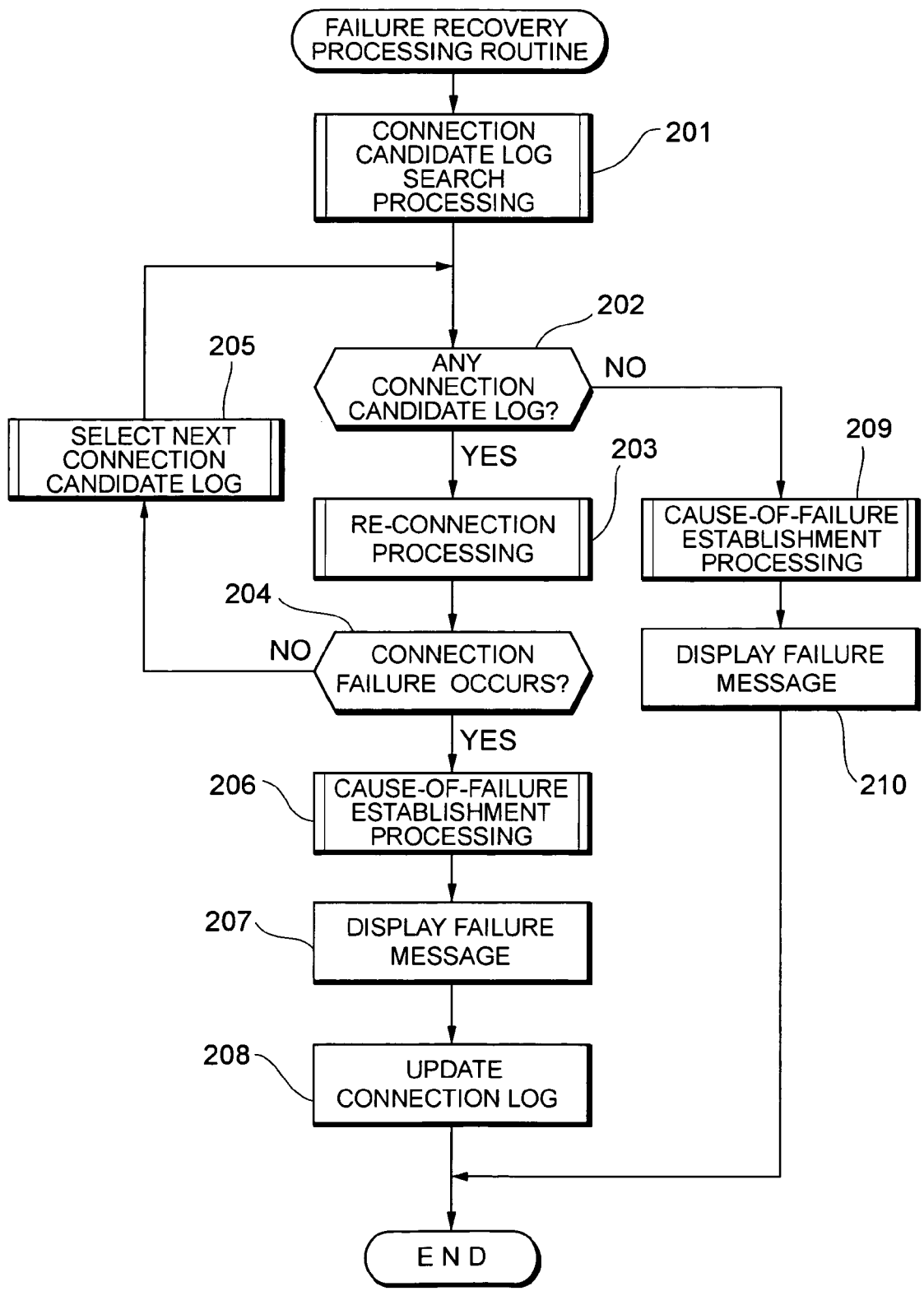
FIG. 11 is a flowchart illustrating a failure recovery processing routine.

FIG. 11 is a flowchart illustrating the failure recovery processing routine sequence. The switch 20 first calls the connection candidate log search program 420 and searches for one or more connection candidate logs from among the plurality of the reference logs stored in the reference log storage table 310 (step 201). In this specification, the connection candidate log means a log for re-connecting to a network node to which connection has failed. The connection candidate log search processing will be described later in detail.

If a connection candidate log exists (step 202; YES), the switch 20 calls the re-connection program 440 and re-connects to the network node by using the connection candidate log (step 203). The re-connection processing will be described later in detail.

If a connection failure occurs during re-connection (step 204; NO), the switch 20 selects the next connection candidate log (step 205) and repeats the processing in step 204 and subsequent steps.

If a connection failure does not occur and re-connection succeeds (step 204; YES), the switch 20 calls the cause-of-failure establishment program 430 and performs cause-of-failure establishment processing (step 206). The cause-of-failure establishment processing is processing to establishing the cause of a connection failure by comparing the standard information stored in the standard information storage table 340 with a failure log acquired when the connection failure occurs. Processing to establishing the cause of the failure will be described later in detail.

Next, the switch 20 calls the failure message display program 450 and displays a failure message on the display 24 (step 207). As in the example shown in FIG. 9, the failure message is for explaining the cause of the failure. Causes of the failure include a timeout, where the switch 20 does not receive ordered sets within a predetermined time period, and the transmission order or transmission timing for ordered sets transmitted from the network node being different from that of ordered sets for the connection log.

Next, the switch 20 stores the reference log with which re-connection has succeeded in the connection log storage table 320 and updates the "registered log information" indicating which product provided by which vendor that reference log is for connection to (step 208). Meanwhile, if no connection candidate log exists (step 202; YES), the switch 20 calls the cause-of-failure establishment program 430 and performs processing (step 209) for establishing the cause of the failure, and calls the failure message display program 450 and displays a failure message on the display 24 (step 210).

Figure 12:
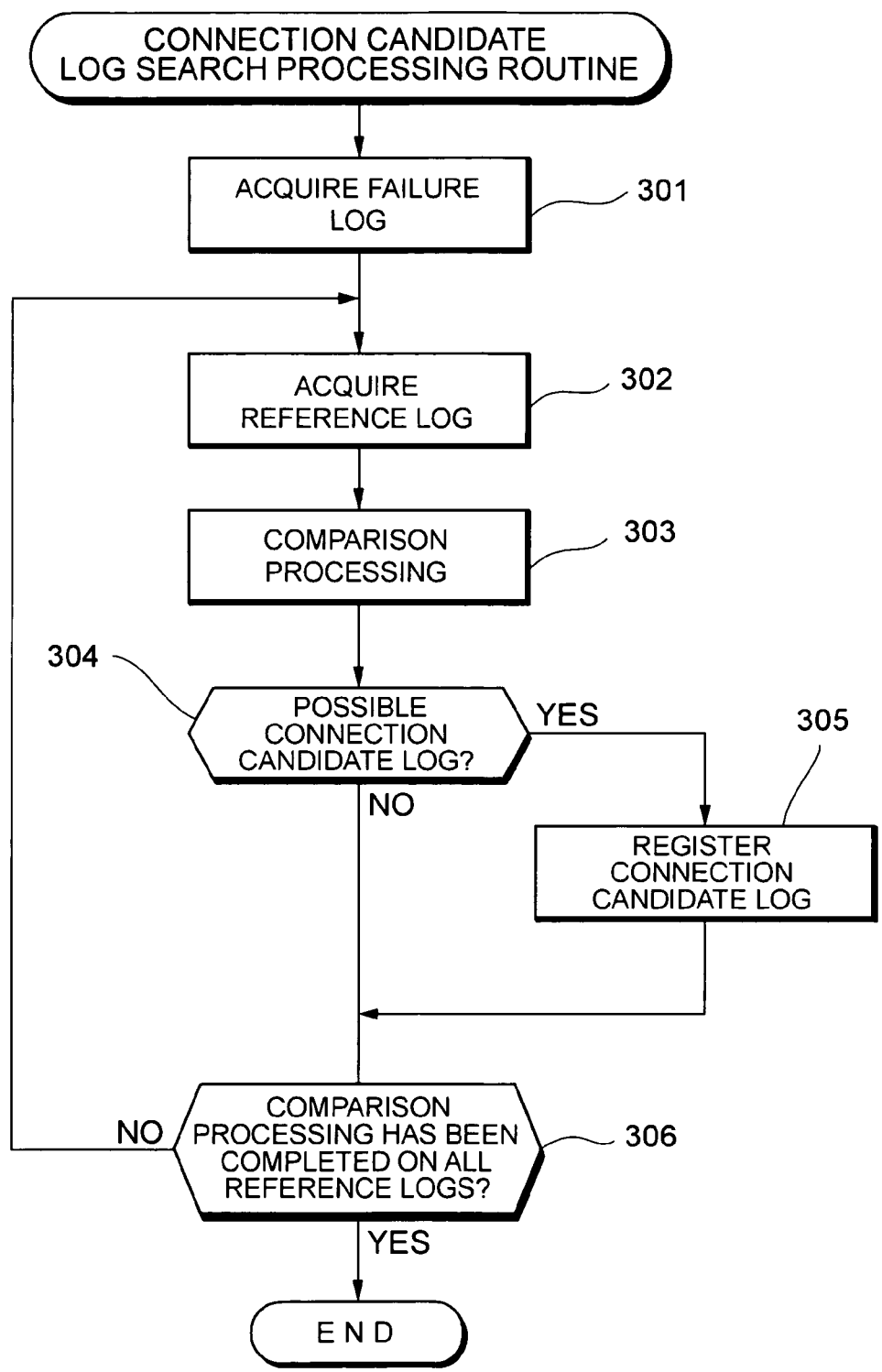
FIG. 12 is a flowchart illustrating a connection candidate log search processing routine.

FIG. 12 is a flowchart illustrating a connection candidate log search processing routine sequence. The switch 20 first acquires a failure log from the failure log storage table 330 (step 301) and selects a reference log from the reference log storage table 310 (step 302).

Next, the switch 20 compares the failure log and reference log (step 303) and checks whether or not the selected reference log can be a connection candidate log (step 304). The connection candidate log is preferably the reference log having the type, issue timing, and issue number, etc. for ordered sets or Fibre Channel frames as similar as possible to those contained in the sequence transmitted from the network node on which connection processing has failed. The switch 20 can acquire information including the type, issue timing, issue number, and timeout period, etc., for ordered sets or Fibre Channel frames contained in the sequence transmitted from the network node on which connection processing has failed, by analyzing a failure log.

The switch 20 checks whether or not the selected reference log can be a connection candidate log in the following order: (1) the transmission order of ordered sets or Fibre Channel frames contained in the sequence transmitted from a network node on which connection processing has failed; (2) the transmission timing for ordered sets or Fibre Channel frames contained in a sequence transmitted from a network node on which connection processing has failed; and (3) the issue number of ordered sets or Fibre Channel frames transmitted from a network node on which connection processing has failed.

In other words, from among a plurality of reference logs, a reference log having a transmission order of ordered sets or Fibre Channel frames that is the same as or similar to (1) above is searched for as a first priority connection candidate log. If there is a reference log having the transmission order of ordered sets or Fibre Channel frames that is the same as or similar to (1) above, that reference log is set as the first priority connection candidate log.

Next, from among the plurality of the reference logs, one having a transmission timing for ordered sets or Fibre Channel frames that is the same as or similar to the above to (2) above is searched for as a second priority connection candidate log. If there is a reference log having the transmission timing for ordered sets or Fibre Channel frames that is the same as or similar to (2) above, that reference log is set as the second priority connection candidate log.

After that, from among the plurality of the reference logs, one having issue number of ordered sets or Fibre Channel frames that is the same as or similar to as (3) above is searched for as the third priority connection candidate log. If there is a reference log having the issue number of ordered sets or Fibre Channel frames that is the same as or similar to (3) above, that reference log is set as the third priority connection candidate log.

In addition to the above, if characteristic ordered sets are transmitted only from a product provided by a specific vendor, whether or not the selected reference log may be a connection candidate log can be checked based on whether or not those specific ordered sets exist. A connection candidate log may be searched for based on (2) above only when it cannot be searched for based on (1) above, and based on (3) above only when it cannot be searched for based on (2) above.

If the selected reference log can be a connection candidate log (step 304; YES), the switch 20 registers the selected reference log as a connection candidate log (step 305). If there is a plurality of connection candidate logs, the priority is preferably determined according to the degree of similarity.

Meanwhile, if the selected reference log cannot be a connection candidate log (step 304; NO), the switch 20 goes on to step 306.

The switch 20 checks whether or not comparison processing (step 303) has been performed on all reference logs stored in the reference log storage table 310 (step 306). If the comparison processing has not been performed on all reference logs (step 306; NO), the switch 20 repeats the processing of step 302 and subsequence steps. Meanwhile, if the comparison processing has been performed on all reference logs (step 306; YES), the switch 20 ends the connection candidate log search processing routine.

Figure 13:
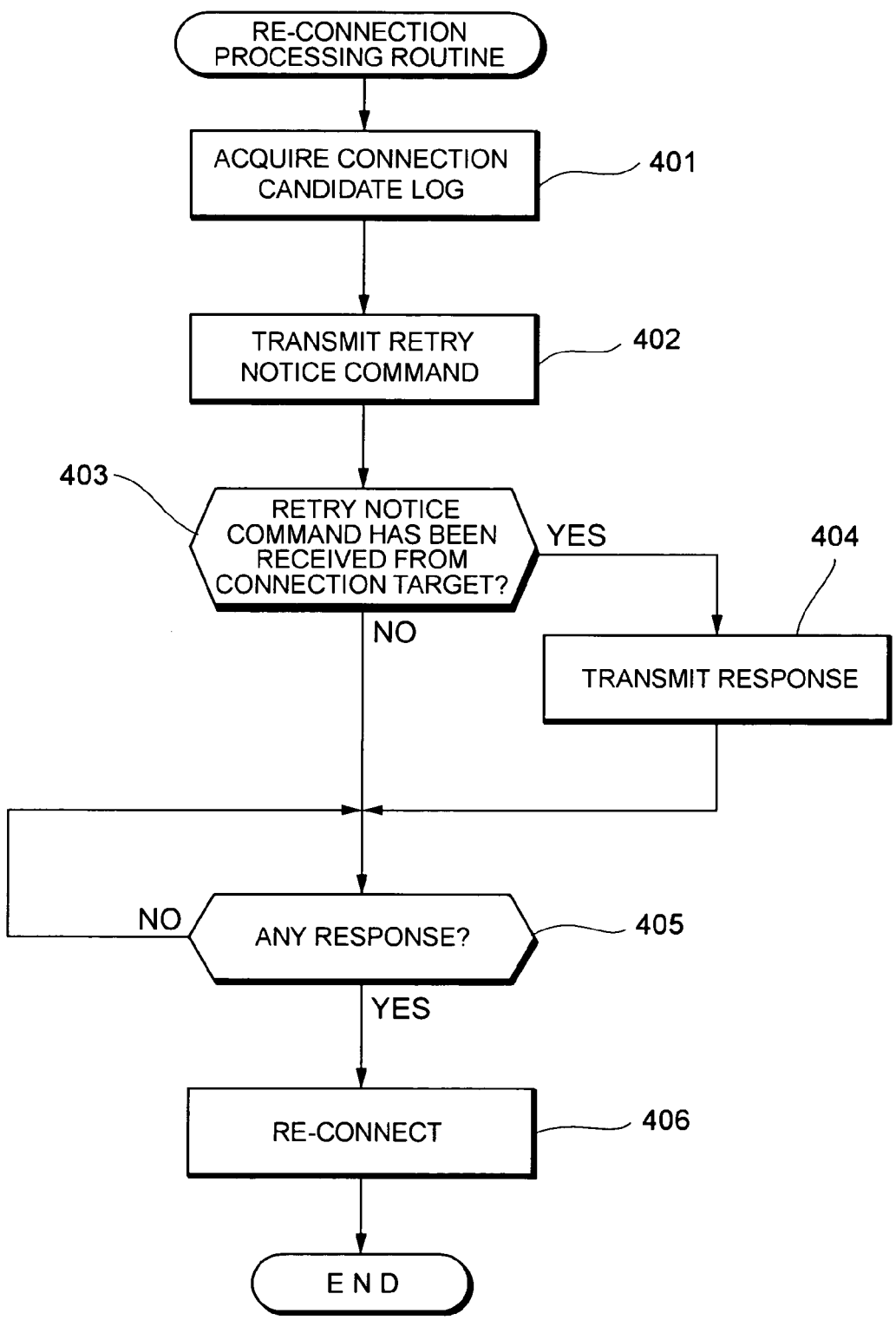
FIG. 13 is a flowchart illustrating a re-connection processing routine.

FIG. 13 is a flowchart illustrating a re-connection processing routine sequence. The switch 20 first acquires a connection candidate log (step 401) and transmits a retry notice command to a network node on which connection processing has failed (step 402). The retry notice command is a command for notifying re-connection is being attempted.

If the network node on which connection processing has failed has a network failure recovery function, a retry notice command may be transmitted from that node to the switch 20. Accordingly, the switch 20 checks whether or not a retry notice command has been transmitted from the network node on which connection processing has failed (step 403).

If a retry notice command has been transmitted from the network node (step 403; YES), the switch 20 responds to the retry notice command from the network node (step 404).

Meanwhile, if a retry notice command has not been transmitted from the network node (step 403; NO), the switch 20 waits for a response to the retry notice command transmitted in step 402 (step 405).

The switch 20, on receiving a response from the network node (step 405; YES), re-connects to the network node by using the connection candidate log (step 406).

Figure 14:
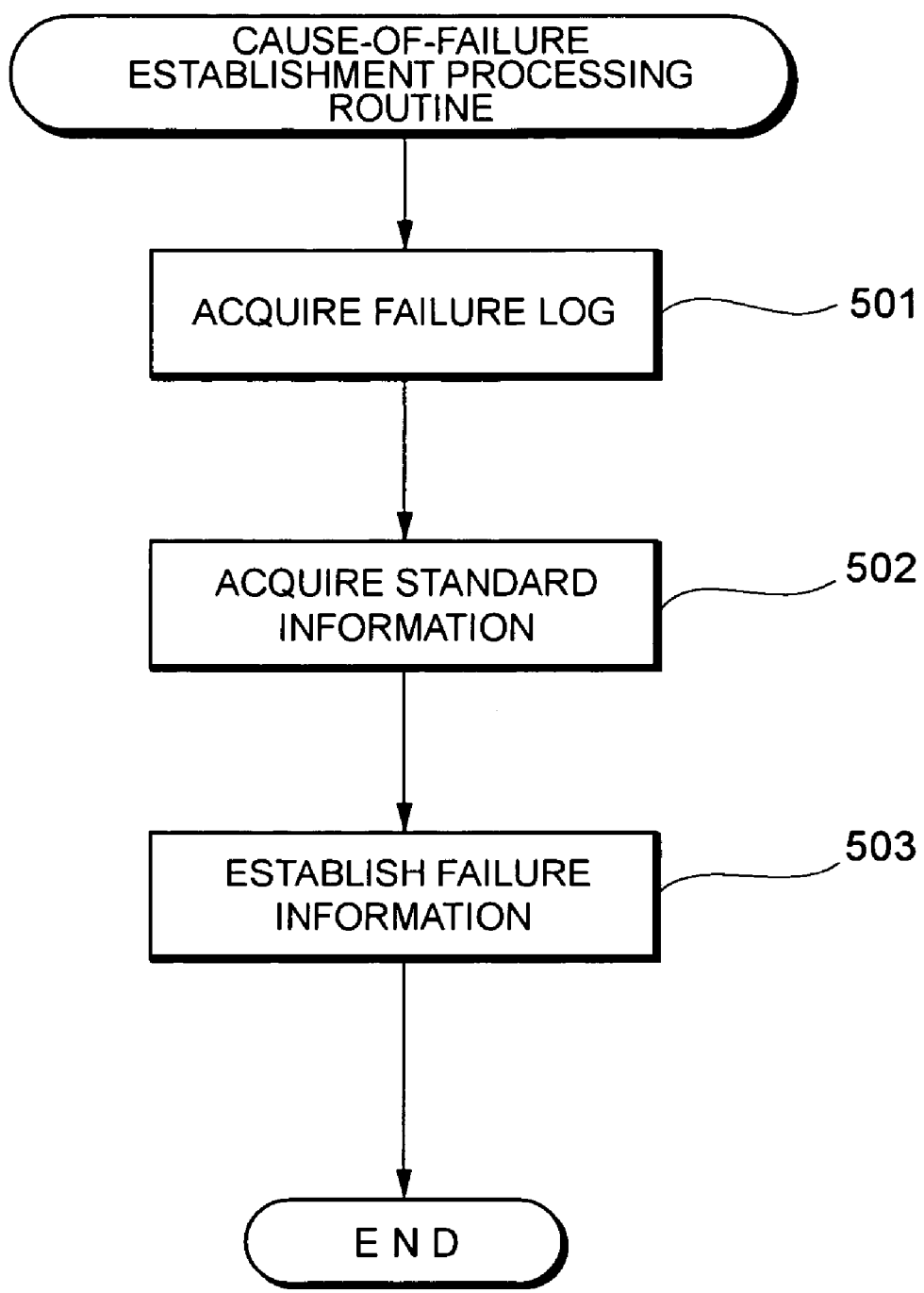
FIG. 14 is a flowchart illustrating a cause-of-failure establishment processing routine.

FIG. 14 is a flowchart illustrating a cause-of-failure establishment processing routine sequence. The switch 20 first acquires a failure log from the failure log storage table 330 (step 501), and acquires standard information about Fibre Channel Protocol from the standard information storage table 340 (step 502).

The switch 20 establishes the cause of the failure in the connection log with which connection to the network node has been attempted by comparing the failure log and the standard information (step 503). For example, the switch 20 establishes the cause of the failure based on the following information (1)-(3): (1) the difference between the transmission order of ordered sets or Fibre Channel frames contained in the sequence transmitted between the switch 20 and the network node on which connection processing has failed and that of ordered sets or Fibre Channel frames contained in the sequence according to Fibre Channel Protocol; (2) the difference between the transmission timing for ordered sets or Fibre Channel frames contained in the sequence transmitted between the switch 20 and the network node on which connection processing has failed and that for the ordered sets or Fibre Channel frames contained in the sequence according to Fibre Channel Protocol; and (3) the difference between the issue number of ordered sets or Fibre Channel frames contained in the sequence transmitted between the switch 20 and the network node on which connection processing has failed and that of ordered sets or Fibre Channel frames contained in the sequence according to Fibre Channel Protocol.

The switch 20 may also establish the cause of the failure based on information other than (1)-(3) above.

According to the present embodiment, when connection processing for a node on the FC-SAN 200 fails because of the difference in standard interpretation between vendors, or because of the large-scale network configuration of the FC-SAN 200, the switch 20 selects a connection candidate log from among a plurality of reference logs prepared in advance and re-connects to the node. Therefore, the connection failure is automatically recovered from. Particularly, because the switch 20 is connected to both the host computer 10 and storage system 30, there is a great advantage in the switch 20 having a network node function. The switch 20 can recover from a connection failure not only between the host computer 10 and switch 20, but also between the storage system 30 and switch 20.

In the present embodiment, only one of the host computer 10, the switch 20, and the storage system 30 may have the network failure recovery function. For example, only the host computer 10 may have the network failure recovery function, or only the storage system 30 may have it. If the host computer 10 has the network failure recovery function, the host computer 10 can recover from a connection failure between the host computer 10 and switch 20. In that case, if the host computer 10 is directly connected to the storage system 30, but not via the switch 20, the host computer 10 can recover from a connection failure between the host computer 10 and the storage system 30. If the storage system 30 has the network failure recovery function, the storage system 30 can recover from a connection failure between the storage system 30 and the switch 20. In that case, if the host computer 10 is directly connected to the storage system 30, but not via the switch 20, the storage system 30 can recover from a connection failure between the host computer 10 and storage system 30.

Alternatively, two or more of the host computer 10, the switch 20, and the storage system 30 may have the network failure recovery function. If a network node (e.g., a tape library, backup server, media server, or virtualization device, etc.) other than the host computer 10, switch 20, and storage system 30 is connected to the storage network system 100, that network node may have the network failure recovery function.

Figure 15:
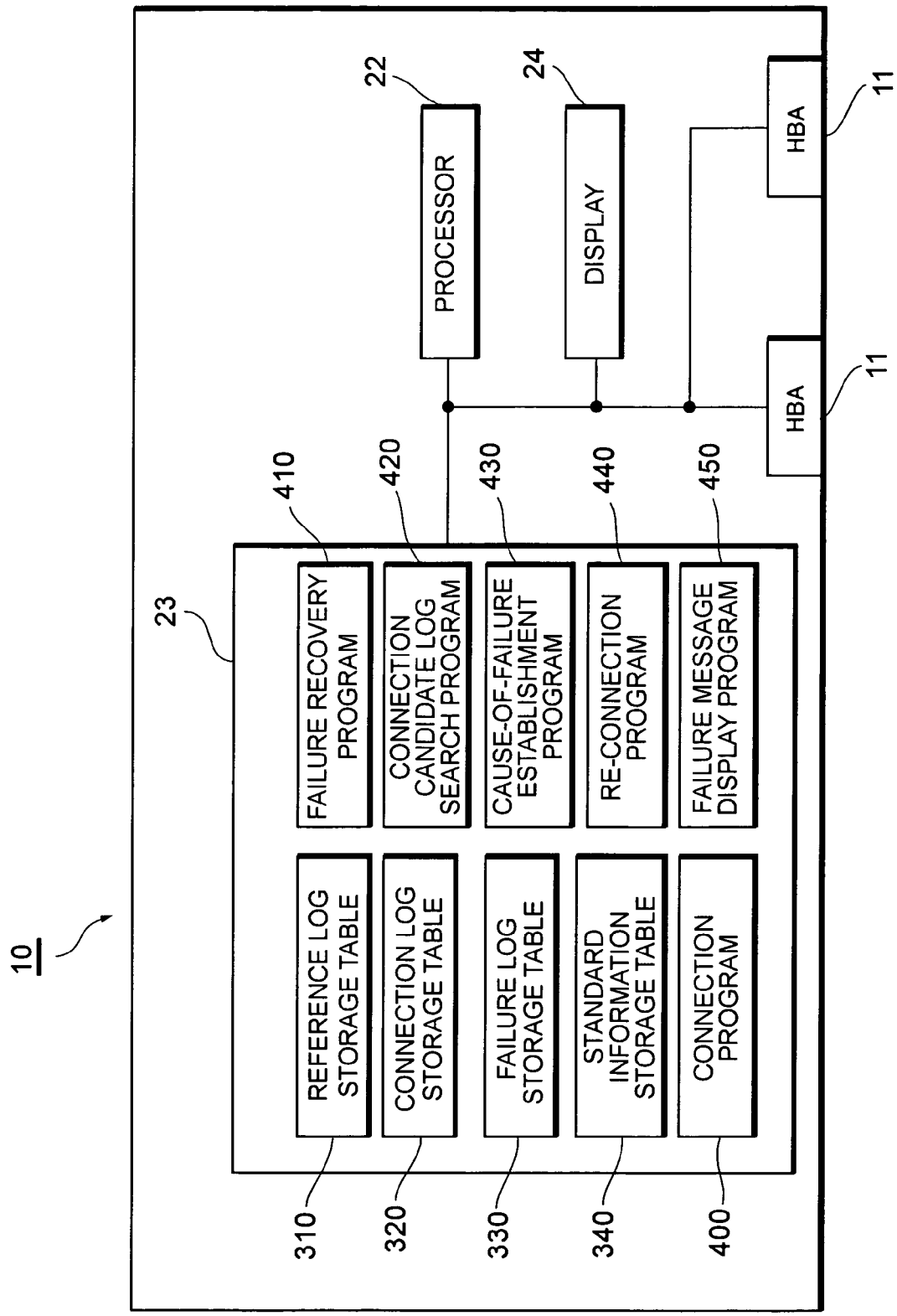
FIG. 15 is a diagram showing the hardware configuration of a host computer according to an embodiment of the present invention.

FIG. 15 shows the hardware configuration of the host computer 10 having the network failure recovery function. The host computer 10 has one or more host bus adapters 11, processor 12, storage device 13, and display 14. The storage device 13 stores the reference log storage table 310, connection log storage table 320, failure log storage table 330, standard information storage table 340, connection program 400, failure recovery program 410, connection candidate log search program 420, cause-of-failure establishment program 430, re-connection program 440, and failure message display program 450. When a connection failure occurs, the processor 12 interprets and executes the command code of the above programs (the failure recovery program 410, connection candidate log search program 420, cause-of-failure establishment program 430, re-connection program 440, and failure message display program 450) and performs failure recovery processing. A failure message is displayed on the display 14 when a connection failure occurs.

Figure 16:
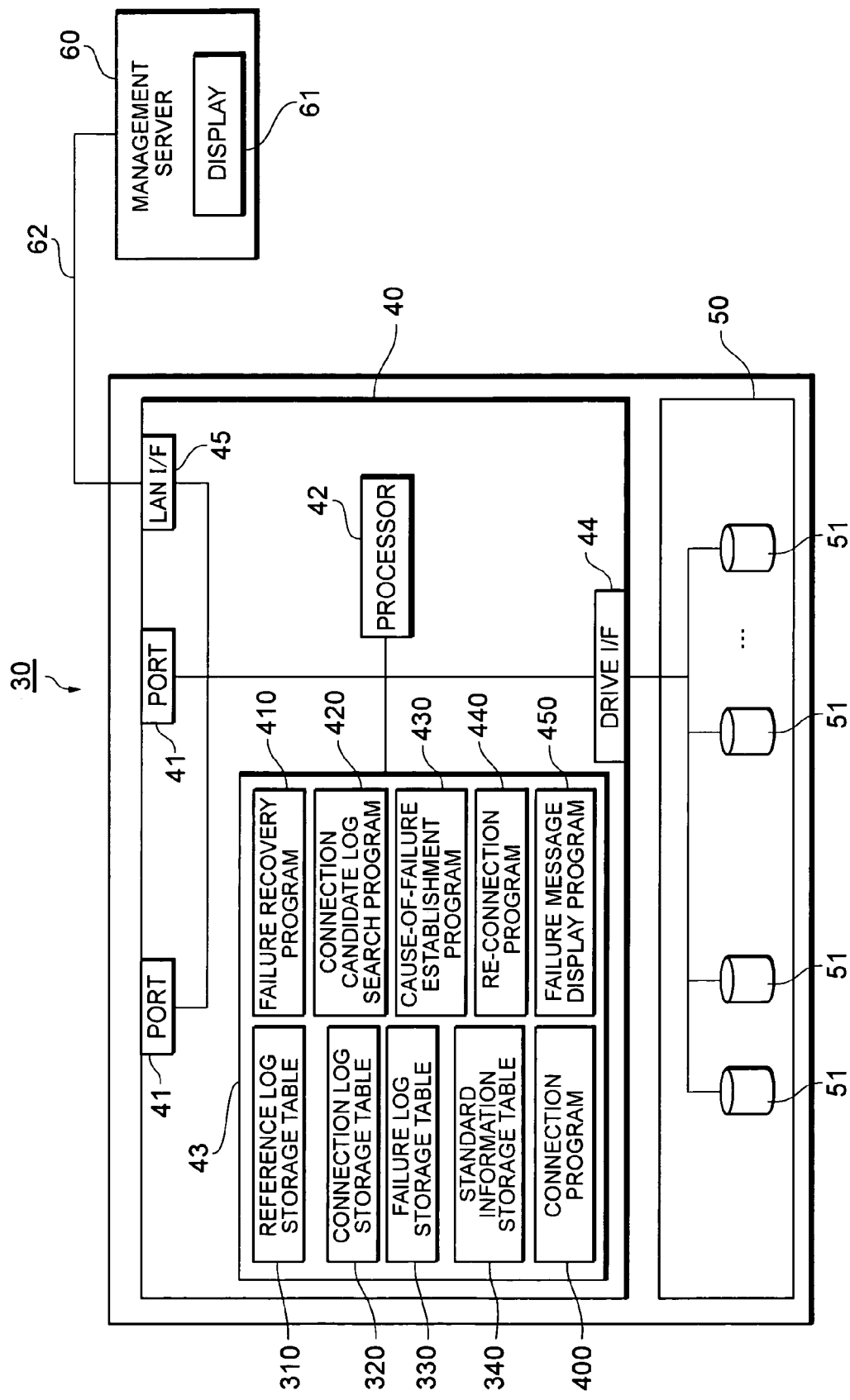
FIG. 16 is a diagram showing the hardware configuration of a storage system according to an embodiment of the present invention.

FIG. 16 shows the hardware configuration of the storage system 30 having the network failure recovery function. A controller 40 has one or more ports 41, processor 42, memory 43, drive interface 44, and LAN interface 45. The memory 43 stores the reference log storage table 310, connection log storage table 320, failure log storage table 330, standard information storage table 340, connection program 400, failure recovery program 410, connection candidate log search program 420, cause-of-failure establishment program 430, re-connection program 440, and failure message display program 450. When a connection failure occurs, the processor 42 interprets and executes the command code of the above programs (the failure recovery program 410, connection candidate log search program 420, cause-of-failure establishment program 430, re-connection program 440, and failure message display program 450) and performs failure recovery processing.

The LAN interface 45 is connected, via a management LAN 62, to a management server 60. The management LAN 62 is a LAN for TCP/IP communication configured via an Ethernet® cable or the like. The management server 50 manages the access path settings (LAN masking and zoning, etc.) between the host computer 10 and storage system 30. The management server 60 includes a display 61. A failure message is displayed on the display 61 when a connection failure occurs.

Figure 17:
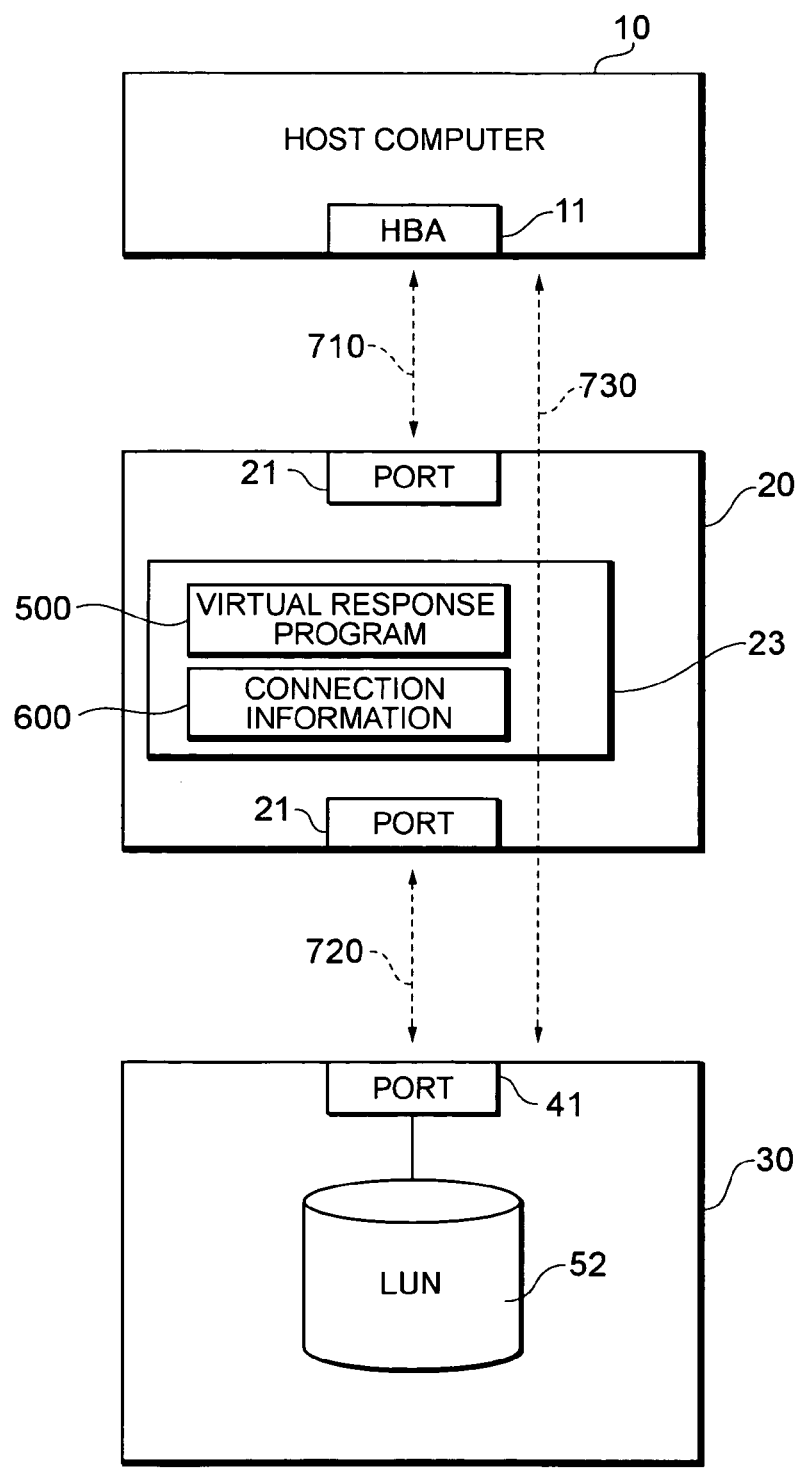
FIG. 17 is a diagram showing a virtual response function according to an embodiment of the present invention.

Next, a virtual response function of the switch 20 will also be described with reference to FIG. 17. The switch 20 has a virtual response program (virtual response section) 500 that sends back a virtual response to a request from the host computer 10 or storage system 30. In this specification, the "virtual response" means responding to a requester on behalf of a request destination. In a first example of the virtual response, the switch 20 sends back a virtual response to an inquiry command transmitted from the host computer 10 to the storage system 30 for the host computer 10 to acquire information, such as a vendor name, device name, product number, WWN (World Wide Name), and LUN (Logical Unit Number), etc. from the storage system 30, so that information originally acquired from the storage system 30 can be acquired from the switch 20. In a second example of the virtual response, the switch 20 sends back a virtual response to an inquiry transmitted from the storage system 30 to the host computer 10 for the storage system 30 to acquire the WWN of the host computer 10, so that the information originally acquired from the host computer 10 can be acquired from the switch 20.

The first example of the virtual response will now be further described. Before establishing a link 710 between the host computer 10 and the switch 20, the switch 20 establishes a link 720 between the storage system 30 and the switch 20. When the link 720 is established, the switch 20 transmits an inquiry command to the storage system 30 and acquires information, such as the vendor name, device name, product number, WWN (World Wide Name), and LUN (Logical Unit Number), from the storage system 30. The switch 20 then stores the acquired information as connection information 600 in the storage device 23. However, in some cases a request for establishing the link 710 may be transmitted from the host computer 10 to the switch 20 before the link 720 is established. In that case, the switch 20 sends back a reject frame to the host computer 10 and refuses to establish the link 710. After that, when the link 720 is established, the switch 20 establishes the link 710 by transmitting a re-connection notice to the host computer 10.

When the links 710 and 720 have been established, the host computer 10 establishes a link 730 between the host computer 10 and the storage system 30 and acquires storage system 30 information by transmitting an inquiry command to the storage system 30. The switch 20 then acquires the inquiry command transmitted from the host computer 10 to the storage system 30, and sends back a virtual response, on behalf of the storage system 30, to the host computer 10 by transmitting the connection information 600 acquired in advance to the host computer 10. If, for example, the storage system 30 is overloaded and cannot immediately respond to an inquiry from the host computer 10, a timeout error may occur. However, occurrence of that error (a network failure) can be prevented by the switch 20 sending back a virtual response.

The second example of the virtual response will now be further described. Before establishing the link 720 between the storage system 30 and the switch 20, the switch 20 establishes the link 710 between the host computer 10 and the switch 20. When the link 710 is established, the switch 20 sends an inquiry to the host computer 10 and acquires the WWN (World Wide Name) of the host computer 10. The switch 20 stores the acquired WWN as connection information 600 in the storage device 23. However, in some cases a request for establishing the link 720 may be transmitted from the storage system 30 to the switch 20 before the link 710 is established. In that case, the switch 20 sends back a reject frame to the storage system 30 and refuses to establish the link 720. After that, when the link 710 is established, the switch 20 establishes the link 720 by transmitting a re-connection notice to the storage system 30.

When the links 710 and 720 are established, the storage system 30 establishes the link 730 between the host computer 10 and the storage system 30, and acquires the WWN of the host computer 10 by sending an inquiry to the host computer 10. The switch 20 then sends back a virtual response, on behalf of the host computer 10, to the inquiry from the storage system 30 to the host computer 10 by transmitting the connection information 600 acquired in advance to the storage system 30. If, for example, the host computer is overloaded and cannot immediately respond to an inquiry from the storage system 30, a timeout error may occur. However, occurrence of that error (a network failure) can be prevented by the switch 20 sending back a virtual response.

In another example of the virtual response, if the host computer 10 requests some processing via the link 730 to the storage system 30 but the storage system 30 is overloaded and cannot immediately respond to that request, the switch 20 transmits a retry request to the host computer 10 before a timeout error occurs. Thus the timeout error can be prevented. The switch 20 can calculate the timeout period based on the standard Fibre Channel Protocol information stored in the standard information storage table 340 in the storage device 23. In the same way, the switch 20 can send a retry request to the storage system 30 before a processing request transmitted from the storage system 30 to the host computer 10 is timed out.

A network node (other than a switch) on the FC-SAN 200 the host computer 10 and the storage system 30 are connected to may also have the above described virtual response function.

Although the FC-SAN 200 is used as an example of a storage network, the present embodiment can also apply to any storage network using communication protocols other than Fibre Channel Protocol.

I claim:

1. A network node for recovering from a connection failure between a plurality of network nodes separately connected to a network, the network node comprising:
   a storage unit that stores a plurality of reference logs for performing normal connection processing between network nodes;
   a connection candidate log search unit that searches for a connection candidate log from among the plurality of the reference logs based on a failure log acquired when the connection failure between the network nodes occurs; and
   a re-connection unit that attempts to re-connect the network nodes by using the connection candidate log,
   wherein the re-connection unit executes:
      first processing for acquiring the failure log;
      second processing for analyzing the failure log and acquiring network information including a transmission order, transmission timing and issue number of ordered sets or Fibre Channel frames contained in the sequence transmitted from a network node on which connection processing has failed;
      third processing for comparing the failure log with the reference logs stored in the storage unit and determining whether or not the reference logs can be a connection candidate log,
         wherein if there is a reference log, among the plurality of the reference logs, having the transmission order of ordered sets or Fibre Channel frames that is the same as or similar to the transmission order of ordered sets or Fibre Channel frames contained in the sequence transmitted from the network node on which connection processing has failed, that reference log is set as a first priority connection candidate log,
         wherein if there is a reference log, among the plurality of the reference logs, having the transmission timing for ordered sets or Fibre Channel frames that is the same as or similar to the transmission timing for ordered sets or Fibre Channel frames contained in the sequence transmitted from the network node on which connection processing has failed, that reference log is set as a second priority connection candidate log, and
         wherein if there is a reference log, among the plurality of the reference logs, having the issue number of ordered sets or Fibre Channel frames that is the same as or similar to the issue number of ordered sets or Fibre Channel frames contained in the sequence transmitted from the network node on which connection processing has failed, that reference log is set as a third priority connection candidate log; and
      fourth processing for attempting to re-connect to the network node on which connection processing has failed using, of the connection candidate logs, the connection candidate log having a high priority.

2. The network node according to claim 1, wherein the fourth processing includes transmitting a retry notice command for notifying a connection target that re-connection between the network nodes is being attempted to the connection target, and attempting to re-connect the network nodes after receiving a response to the retry notice command from the connection target.

3. The network node according to claim 2, further comprising:
   a cause-of-failure establishment unit that establishes a cause of the failure based on an interface protocol between the network nodes and the failure log; and
   a display that displays the cause of the failure.

4. The network node according to claim 2, further comprising a connection unit that performs connection processing between the network nodes by using a connection log with which normal connection processing between the network nodes has been performed.

5. The network node according to claim 2, further comprising:
- a connection information acquisition unit that acquires in advance, from a second network node, connection information that a first network node acquires from the second network node; and
- a virtual response unit that sends back the connection information acquired in advance to the first network node in response to an information acquisition request from the first network node to the second network node.

6. The network node according to claim 2, further comprising a virtual response unit that transmits, before a processing request transmitted from a first network node to a second network node times-out, a retry request to the first network node.

7. The network node according to claim 2, wherein the reference logs are connection logs with which various vendors have confirmed verification for connection to network nodes provided by those vendors.

8. The network node according to claim 2, wherein the fourth processing includes:
- acquiring a connection target log having a high priority from among the connection candidate logs;
- transmitting a first command for notifying re-connection is being attempted to the network node on which connection processing has failed;
- checking whether or not a second command notifying re-connection is being attempted has been transmitted from the network node on which connection processing has failed;
- if the second command has been transmitted, transmitting a response to the second command to the network node; and
- if the second command has not been transmitted from the network node, waiting for a response to the first command and attempting to re-connect to the network on which connection processing has failed.

9. A switch for searching for a connection candidate log from among a plurality of reference logs based on a failure log acquired when a connection failure occurs between a plurality of network nodes that are separately connected to a network, and attempting to re-connect the network nodes by using the connection candidate log, the switch comprising:
- a storage unit that stores a plurality of reference logs for performing normal connection processing between the plurality of network nodes; and
- a processor programmed to search for a connection candidate log from among the plurality of the reference logs based on a failure log acquired when a connection failure occurs between the plurality of network nodes, and that attempts to re-connect the plurality of network nodes;
- wherein the processor is programmed to execute:
  - first processing for acquiring the failure log;
  - second processing for analyzing the failure log and acquiring network information including a transmission order, transmission timing and issue number of ordered sets or Fibre Channel frames contained in the sequence transmitted from a network node on which connection processing has failed;
  - third processing for comparing the failure log with the reference logs stored in the storage unit and determining whether or not the reference logs can be a connection candidate log,
    - wherein if there is a reference log, among the plurality of the reference logs, having the transmission order of ordered sets or Fibre Channel frames that is the same as or similar to the transmission order of ordered sets or Fibre Channel frames contained in the sequence transmitted from the network node on which connection processing has failed, that reference log is set as a first priority connection candidate log,
    - wherein if there is a reference log, among the plurality of the reference logs, having the transmission timing for ordered sets or Fibre Channel frames that is the same as or similar to the transmission timing for ordered sets or Fibre Channel frames contained in the sequence transmitted from the network node on which connection processing has failed, that reference log is set as a second priority connection candidate log, and
    - wherein if there is a reference log, among the plurality of the reference logs, having the issue number of ordered sets or Fibre Channel frames that is the same as or similar to the issue number of ordered sets or Fibre Channel frames contained in the sequence transmitted from the network node on which connection processing has failed, that reference log is set as a third priority connection candidate log; and
  - fourth processing for attempting to re-connect to the network node on which connection processing has failed using, of the connection candidate logs, the connection candidate log having a high priority.

10. The switch according to claim 9, wherein the third processing includes setting reference logs having high degrees of similarity to the network information as the connection candidate lops having the respective priority levels.

11. The switch according to claim 9, wherein the processor establishes a cause for the connection failure between the plurality of network nodes based on information about at least one of:
- (1) the difference between the transmission order of ordered sets or Fibre Channel frames contained in a sequence transmitted between the switch and a network node for which connection processing has failed, and that of ordered sets or Fibre Channel frames contained in a sequence according to Fibre Channel Protocol;
- (2) the difference between the transmission timing for ordered sets or Fibre Channel frames contained in a sequence transmitted between the switch and a network node for which connection processing has failed, and that for ordered sets or Fibre Channel frames contained in a sequence according to Fibre Channel Protocol; and
- (3) the issue number of ordered sets or Fibre Channel frames contained in a sequence transmitted between the switch and a network node for which connection processing has failed, and that of ordered sets or Fibre Channel frames contained in a sequence according to Fibre Channel Protocol.

12. The switch according to claim 9,
- wherein the fourth processing includes transmitting a retry notice command to the communication target and attempting to re-connect the network nodes after receiving a response to the retry notice command from the connection target, and
- wherein the retry notice command is a command for notifying a connection target that re-connection between the network nodes is being attempted.

13. The switch according to claim 12, wherein the fourth processing includes:
- acquiring a connection target log having a high priority from among the connection candidate logs;

transmitting, as the retry notice command, a first command for notifying re-connection is being attempted to the network node on which connection processing has failed;

checking whether or not a second command notifying re-connection is being attempted has been transmitted from the network node on which connection processing has failed;

if the second command has been transmitted, transmitting a response to the second command to the network node; and if the second command has not been transmitted from the network node, waiting for a response to the first command and attempting to re-connect to the network on which connection processing has failed.

14. The switch according to claim 12, wherein the plurality of network nodes includes host computers and storage systems that are separately connected to a storage network for performing data communication based on Fibre Channel Protocol.

15. A network failure recovery method for recovering from a connection failure between a plurality of network nodes separately connected to a network, the method comprising:

searching for a connection candidate log from among a plurality of reference logs for performing normal connection processing between the network nodes based on a failure log acquired when a connection failure occurs between the network nodes; and attempting to re-connect the network nodes by using the connection candidate log, wherein the step of searching for a connection candidate log includes executing:

first processing for acquiring the failure log;

second processing for analyzing the failure log and acquiring network information including a transmission order, transmission timing and issue number of ordered sets or Fibre Channel frames contained in the sequence transmitted from a network node on which connection processing has failed;

third processing for comparing the failure log with the plurality of the reference lops stored in the storage unit and determining whether or not the plurality of reference logs can be a connection candidate log, in which, wherein if there is a reference log, among the plurality of the reference logs, having the transmission order of ordered sets or Fibre Channel frames that is the same as or similar to the transmission order of ordered sets or Fibre Channel frames contained in the sequence transmitted from the network node on which connection processing has failed, that reference log is set as a first priority connection candidate log, wherein if there is a reference log, among the plurality of the reference logs, having the transmission timing for ordered sets or Fibre Channel frames that is the same as or similar to the transmission timing for ordered sets or Fibre Channel frames contained in the sequence transmitted from the network node on which connection processing has failed, that reference log is set as a second priority connection candidate log, and wherein if there is a reference log, among the plurality of the reference logs, having the issue number of ordered sets or Fibre Channel frames that is the same as or similar to the issue number of ordered sets or Fibre Channel frames contained in the sequence transmitted from the network node on which connection processing has failed, that reference log is set as a third priority connection candidate log; and fourth processing for attempting to re-connect to the network node on which connection processing has failed using, of the connection candidate logs, the connection candidate log having a high priority.

16. The network failure recovery method according to claim 15, wherein the fourth processing includes transmitting a retry notice command for notifying a connection target that re-connection between the network nodes is being attempted, and re-connecting the network nodes after receiving a response to the retry notice command from the connection target.

17. The network failure recovery method according to claim 16, further comprising:

establishing a cause of the failure based on an interface protocol between the network nodes and the failure log; and displaying the cause of the failure.

18. The network failure recovery method according to claim 16, further comprising:

performing connection processing between the network nodes by using a connection log with which normal connection processing between the network nodes has been performed.

19. The network failure recovery method according to claim 16, further comprising:

acquiring in advance, from a second network node, connection information that a first network node acquires from the second network node; and sending back the connection information acquired in advance to the first network node in response to an information acquisition request from the first network node to the second network node.

20. The network failure recovery method according to claim 16, further comprising transmitting, before a processing request transmitted from the first network node to a second network node times-out, a retry request to the first network node.

21. The network failure recovery method according to claim 16, wherein the reference logs are connection logs with which various vendors have confirmed verification for connection to network nodes provided by those vendors.

22. The network failure recovery method according to claim 16, wherein the fourth processing includes:

acquiring a connection target log having a high priority from among the connection candidate logs;

transmitting, as the retry notice command, a first command for notifying re-connection is being attempted to the network node on which connection processing has failed;

checking whether or not a second command notifying re-connection is being attempted has been transmitted from the network node on which connection processing has failed;

if the second command has been transmitted, transmitting a response to the second command to the network node; and if the second command has not been transmitted from the network node, waiting for a response to the first command and attempting to re-connect to the network on which connection processing has failed.

* * * * *